Nov. 12, 1968

W. A. BOOTHE ET AL 3,410,291

BRIDGE-TYPE FLUID CIRCUIT

Filed April 30, 1965

Inventors
Willis A. Boothe
Jeffrey N. Shinn
by Paul A. Frank
Their Attorney

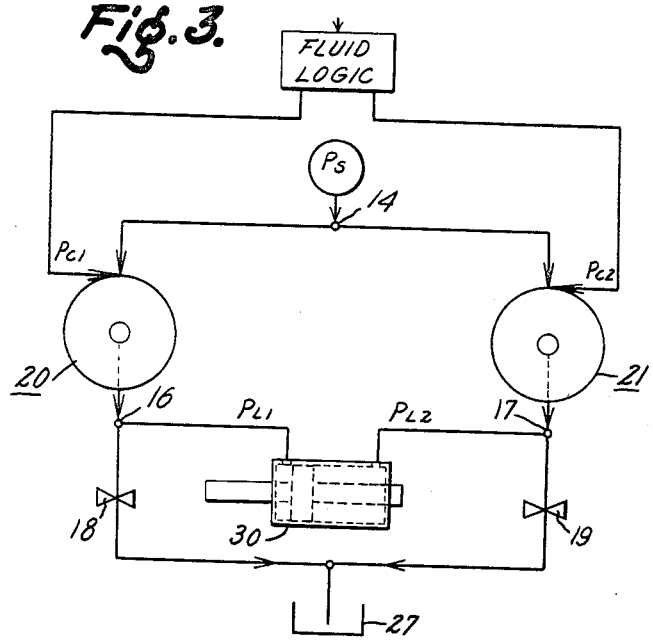
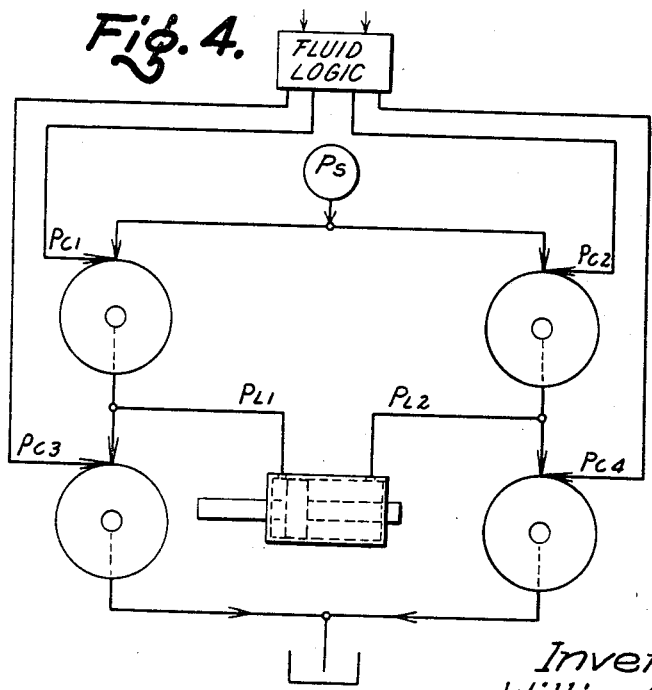

United States Patent Office 3,410,291
Patented Nov. 12, 1968

3,410,291
BRIDGE-TYPE FLUID CIRCUIT
Willis A. Boothe and Jeffrey N. Shinn, Scotia, N.Y., assignors to General Electric Company, a corporation of New York
Filed Apr. 30, 1965, Ser. No. 452,115
12 Claims. (Cl. 137—81.5)

ABSTRACT OF THE DISCLOSURE

A bridge-type fluidic circuit wherein each of the four legs of the bridge includes a fixed or variable type of fluid flow restrictor. The variable flow restrictors are vortex fluid amplifiers utilizing the flow in the associated bridge leg as the main fluid flow which enters the vortex amplifier radially inward. A control fluid from a source of fluid logic enters the vortex amplifier tangentially to control the main fluid. Fluid is supplied to the bridge across two opposed bridge junctures and a load is connected across the remaining two opposed junctures.

Our invention relates to bridge-type power amplifier fluid circuits, and in particular, to such circuits wherein variable fluid flow restrictors of the vortex-type fluid amplifier are employed.

In recent years, reliability has received great emphasis, especially in technologies such as the control system art. In machine tools, rocket motors, and internal combustion engines, components such as valves, pistons, diaphragms and vanes have been most commonly utilized to control fluid flow. It has been found from experience that these mechanical control members have been by far the greatest source of control system failure. The control valve, in general, cannot readily be repaired and in applications such as rocket motors and internal combustion engines, the vehicle not only malfunctions but probably results in eventual complete destruction thereof.

In control systems, amplifiers are used to increase the level or magnitude of signals which appear in the amplifier-associated parts of the control system. An amplifier circuit commonly designated as a power amplifier is employed to increase the power level of a control system signal which controls a substantial power-consuming device. Thus, the power amplifier is often the element in the control system which drives the load either directly, or indirectly by a suitable actuator in communication therewith. In the fluid control system art, the inability to repair malfunctioning fluid control valve members, and the possible extent of resulting damage indicate the need for rugged, durable, and simple fluid control elements in the amplifier stages, and in particular, the power amplifier stage. There is also emphasized the need for novel means and methods for controlling fluid flow.

Therefore, one of the principal objects of our invention is to provide a new and improved power amplifier fluid circuit.

Another object of our invention is to provide a new and improved power amplifier fluid circuit having no moving mechanical parts.

A still further object of our invention is to provide a new and improved power amplifier employing a fluid medium to perform the flow control function of a power amplifier in a bridge-type circuit.

A still further object of our invention is to provide a bridge-type power amplifier fluid circuit that uses fluid flow restrictors in the four legs thereof.

Another object of our invention is to employ vortex-type fluid amplifiers as variable fluid flow restrictors in such bridge circuit.

Briefly stated, our invention is a bridge-type fluid circuit which functions as a push-pull power amplifier. A fluid flow restrictor is located within each of four fluid passages which comprise the four legs of the fluid bridge circuit, and either two or all four of such restrictors are of the variable fluid flow type in the form of vortex fluid amplifiers. A pressurized main fluid is supplied to a first juncture of a first pair of the fluid passages and fluid is removed or drained from the bridge circuit at a second juncture of the second pair of the fluid passages wherein the second juncture is located diametrically opposite the first juncture. Pressurized control fluid is supplied to the control fluid inlets of the vortex fluid amplifiers from a suitable fluid logic circuit which, in general, converts a control system input signal into a pressurized fluid push-pull signal of sufficient magnitude to obtain operation of the vortex fluid amplifiers within their full range of controlled output fluid flow. Suitable fluid connections are provided at the two output junctures of the bridge circuit intermediate the main fluid inlet and fluid drain junctures for conveying the pressurized push-pull fluid signal existing at these two intermediate junctures to a suitable actuator or load device. The fluid elements of our push-pull power amplifier circuit may be constructed within one member of nonporous, structurally rigid material to obtain a rugged, durable and simplified fluid control system device having no moving mechanical parts.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawings, wherein like parts in each of the several figures are identified by the same reference character, and wherein:

FIGURE 3 is a schematic diagram of a second embodiment of our invention employing two vortex fluid amplifiers; and FIGURE 4 is a schematic diagram of a third embodiment of our invention employing four vortex fluid amplifiers.

Figure 1:
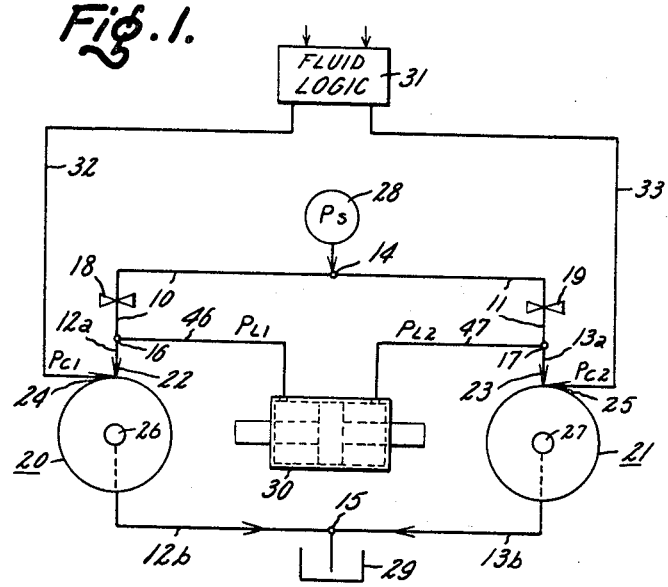
FIGURE 1 is a schematic diagram of a first embodiment of a bridge-type power amplifier fluid circuit employing two vortex fluid amplifiers and constructed in accordance with our invention.

Referring now to the drawings, in FIGURE 1 there is shown a schematic representation of a first embodiment of a bridge-type fluid circuit which operates as a push-pull power amplifier. The bridge circuit is comprised of four fluid passages 10, 11, 12 and 13 connected in bridge circuit relationship to form the four legs thereof. In each of the four passages there is located a fluid flow restrictor of the fixed or variable restrictor types, the requirement being that either two or all four such restrictors be of the variable fluid flow restrictor type. Two variable restrictors are utilized in the circuit embodiments of FIGURES 1 and 3, and four such restrictors in FIGURE 4. Passages 10 and 11 are connected at a juncture 14, passages 12 and 13 are connected at juncture 15, passages 10 and 12 are connected at juncture 16, and passages 11 and 13 are connected at juncture 17. Fixed fluid flow restrictors 18 and 19 are connected within fluid passages 10 and 11, respectively. Variable fluid flow restrictors in the form of vortex fluid amplifiers 20 and 21 are connected in passages 12 and 13, respectively. The fixed and variable fluid flow restrictors will be described in greater detail hereinafter with reference to FIGURE 2.

For the present, vortex amplifiers 20, 21 are described as having main or power fluid inlets 22 and 23, respectively, control fluid inlets 24 and 25, respectively, and fluid outlets 26 and 27, respectively. Juncture 14 is in fluid communication with a source 28 of relatively constant pressurized fluid $P_S$ which supplies pressurized fluid to passages 10, 11 and the main fluid inlets of the vortex amplifiers. Juncture 15 is connected to a fluid drain 29 for removing fluid flowing from the outlets of the vortex amplifiers within the portions of passages 12 and 13 designated 12b and 13b, respectively. Suitable fluid connections are available at the bridge circuit output (fluid passages 46, 47 extending from junctures 16 and 17) for connecting a generally remotely located actuator (or load) 30 in fluid communication therewith. The circuit controlled pressurized fluid at the output (load) junctures 16 and 17 is designated $P_{L1}$ and $P_{L2}$. Since the circuit is of the push-pull type, that is, one of the output pressures $P_{L1}$, $P_{L2}$ increases while the other decreases during nonsteady state operation of the circuit, it is preferred to have fixed fluid flow restrictors 18, 19 of identical construction and variable fluid flow restrictors 20, 21 of identical construction. Under these conditions, in the steady state operation of the circuit the pressurized fluid at junctures 16 and 17 will be of equal pressure $P_{L1}=P_{L2}$. Actuator 30 is illustrated as a piston contained within a cylinder, it being understood that the piston is coupled in a suitable manner to a load device (not shown) driven thereby, fluid pressures $P_{L1}$ and $P_{L2}$ being applied at opposite sides of the piston. Thus, a load (a machine tool as an example) is controlled (in position) by a control system wherein our bridge circuit comprises the power amplifier portion thereof. The control fluid inlets 24 and 25 of the vortex amplifiers supplied with pressurized fluid $P_{C1}$ and $P_{C2}$, respectively, the control fluid being supplied from a fluid logic circuit 31 via fluid passages 32 and 33. The input to logic circuit 31, in general, comprises a control system input signal (command in the case of open loop control or error signal in the case of closed loop control) of the push-pull type supplied by two inlets, as illustrated in FIGURE 1, or a single signal operating about a mean value and supplied by a single inlet as illustrated in FIGURE 3. Fluid logic circuit 31 may include one or more fluid amplifier circuits such as, for example, an oscillator, beat frequency detector, one or more stages of amplification, and a suitable transducer if the input signal is not in pressurized fluid form, the various circuits being interconnected to convert the input signal to an appropriate pressurized push-pull control fluid signal $P_{C1}$, $P_{C2}$ at the output thereof.

The operation of the bridge circuit of FIGURE 1 will now be described. For purposes of simplification, the operation of the circuit with relation to a position control system will be described, although it should be appreciated that many other types of control systems wherein parameters such as rotational speed, load distribution, pressure vehicle attitude, and temperature are controlled may also be provided with the subject power amplifier circuit. Further, actuators other than linear actuators 30 may be used, e.g., limited motion rotary and continuous rotary (hydraulic motor). Initially, assume that steady state conditions prevail such that the position input signal to fluid logic circuit 31 is substantially at zero. Fluid logic circuit 31 converts the substantially zero state of the input signal to substantially equal pressure control fluid signals $P_{c1}$, $P_{c2}$. Since fixed restrictors 18, 19 are of identical construction and thus each produce the same effect on pressurized main fluid $P_S$ flowing therethrough, and equal back pressures are created within the vortex amplifiers by the equal control fluid signals $P_{c1}$, $P_{cc2}$ at steady state conditions, the output pressures $P_{L1}$, $P_{L2}$ are equal and thus actuator 30 remains in a fixed position.

Now, assume that the position input signal orders a change in the position of the load device. Under this transient condition, an error signal is supplied to the fluid logic circuit 31 and the output thereof provides push-pull (unequal magnitude) pressurized fluid signals $P_{c1}$ and $P_{c2}$. In the case wherein the pressure magnitude of the control fluid signal $P_{c1}$ is greater than that of $P_{c2}$, a greater back pressure (greater than the hereinabove steady state value back pressure) is created within vortex amplifier 20 and a smaller back pressure (smaller than the steady state value) is created in amplifier 21. Under these conditions, the pressure magnitude $P_{L1}$ at output juncture 16 is greater (greater than steady state value) than the pressure magnitude $P_{L2}$ (which is now smaller than steady state value) at juncture 17 and the piston of actuator 30 moves in a direction to the right wherein such motion obtains the new desired position of the load as dictated by the position input signal. In like manner, a pressure magnitude of control fluid signal $P_{c2}$ greater than $P_{c1}$, creates a back pressure within vortex amplifier 21 greater than the back pressure in amplifier 20 thereby increasing the pressure magnitude of the fluid $P_{L2}$ at juncture 17 and decreasing the pressure magnitude of fluid $P_{L1}$ juncture 16 and causing movement of the piston in a direction to the left. Thus, it can be appreciated that our power amplifier bridge circuit operates in a push-pull mode.

Figure 2:
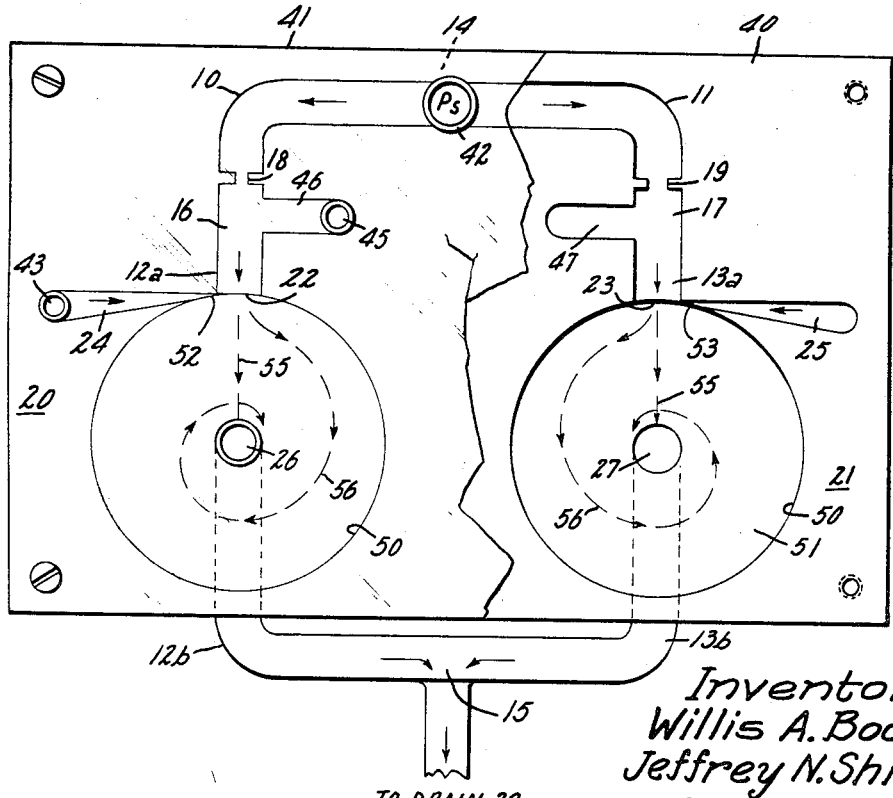
FIGURE 2 is a view in top plan, partly broken away, of the fluid circuit of FIGURE 1.

Referring now to FIGURE 2, there is shown a view in top plan of the bridge circuit shown in FIGURE 1. The bridge circuit may be formed of separate elements which are interconnected by suitable external conduits or tubing, however, the preferred assembly is a construction of all the elements of the bridge circuit in a single member thereby eliminating external interconnecting fluid couplings. Thus, a base member 40 in which the bridge circuit is formed may be selected from virtually any material that is nonporous, has structural rigidity and is nonreactive with the fluid medium employed. Illustratively, various plastics may be used quite advantageously for this purpose, such material permitting low temperature molding to form the interior channels and passages for the fluid medium. Alternatively, materials adaptable to photoetching processes may be employed, facilitating mass production of the bridge-type power amplifiers circuit. In addition, metal and other materials of a more durable nature may be employed and may be slotted or molded to the desired flow path configuration. A face plate 41 is positioned over base member 40, enclosing the various channels and passages to confine fluid therein. Alternatively, the channels and passages may pass completely through the base member 40 and face plates provided on both sides thereof. The face plate is attached to the base member in any suitable manner to obtain a fluid tight fit between the outer surfaces of the base member and face plate, a plurality of screws threaded through such members being illustrated in FIGURE 2.

In FIGURE 2, base member 40 is fabricated to contain a fluid flow configuration that includes fluid passages 10, 11, 12a, 13a, 46 and 47, fixed fluid flow restrictors 18 and 19, junctures 14, 16 and 17 and vortex fluid amplifiers 20 and 21. A fluid entrance hole 42 in face plate 41 is positioned in fluid communication with juncture 14 of fluid passages 10 and 11. Entrance hole 42 provides a passage wherein an external tubing may be inserted and the pressurized main fluid $P_S$ supplied therethrough from external source 28. In like manner, fluid entrance hole 43 in face plate 41 is positioned in fluid communication with the end portion of control fluid inlet 24 and a similar fluid entrance hole (not shown) is also superposed over the corresponding end portion of control fluid inlet 25 for insertion of external tubing 32, 33 to supply the control fluid $P_{c1}$, $P_{c2}$. A fluid exit hole 45 in face plate 41 is positioned in fluid communication with the end of inwardly extending fluid passage 46 and a similar fluid exit hole (not shown) is also superposed over the corresponding end of passage 47 for insertion of external tubing to convey the pressurized load fluid $P_{L1}$, $P_{L2}$ to the externally located actuator 30. Fluid exit holes 26 and 27, the fluid outlets of vortex amplifier 20 and 21, respectively, may also pass through face plate 41, or, alternatively, through the bottom surface of base member 40. These latter two exit holes extend into axial passages which provide means for the insertion of external tubing 12b, 13b to convey the fluid discharged by the vortex amplifiers to juncture 15 and thence to drain 29. It is readily apparent that the fluid entrance and exit holes may be omitted from face plate 41 and the fluid passages extended to the periphery of base member 40 to thereby obtain the necessary communication with external tubing. In any event, the holes through face plate 41 or terminal end of passages at the periphery of base member 40 are threaded or otherwise provided with known means for obtaining fluid-tight connections between the external tubings and bridge circuit. It should also be obvious that inwardly extending fluid passages 46, 47 may extend outwardly from junctures 16, 17.

The vortex fluid amplifier basically comprises a cylindrical wall 50 in base member 40 and a bottom planar portion 51 therein which define a cup shaped cavity or chamber. The cylindrical wall may also pass completely through base member 40 as mentioned with respect to the other fluid passages provided therein, and face plates attached on both sides thereof to define the chamber. The flow of pressurized main fluid is introduced radially into the chamber of vortex amplifier 20 through main fluid inlet 22, the inlet comprising one end of fluid passage 12a terminating as an opening in the cylindrical wall of the vortex amplifier. Because of the radial orientation of passage 12a with respect to the chamber, the main fluid is introduced diametrically into the chambers (in the absence of control fluid input). Control of the passage of main fluid flowing through opening 22 into the chamber is obtained by the flow of pressurized control fluid being tangentially discharged into the chamber through opening 52 within the cylindrical wall of the vortex amplifier. Control fluid inlet passage 24 terminates in a fluid flow restrictor or nozzle having a terminal end, the opening 52. Thus, a jet of pressured $P_{c1}$ control fluid is discharged from opening 52 in a direction substantially normal to the flow of main fluid issuing from opening 22. The control and main fluid supplied to the chamber is discharged therefrom through opening 26 in the bottom (or top) defining member of the chamber to drain 29. Opening 26 is centrally located in the chamber remote from the cylindrical wall thereof for purposes more fully described hereinafter. In like manner, a second vortex fluid amplifier 21 is provided with a main fluid inlet or opening 23 for introducing the main fluid radially into the chamber and a control fluid inlet passage 25 terminating in a nozzle having opening 53 for tangentially discharging a jet of control fluid into the chamber in a direction substantially normal to the flow of fluid issuing from main fluid opening 23. Fluid is discharged from the chamber through opening 27 and thence conveyed to the drain 27 by way of tubing 13b.

The vortex fluid amplifiers function as variable fluid flow restrictors in that the passage of main fluid through the chamber is regulated by the control fluid to obtain a regulator having no moving mechanical parts. The vortex fluid amplifier operates in the following manner. A flow of pressurized main fluid which is to be controlled is supplied through passage 12a and discharged in a radial direction through opening 22 toward the discharge opening 26 in the chamber. Rather than supply mechanical closure means for throttling the flow of fluid through opening 22, the vortex amplifier utilizes a jet of pressurized control fluid. Because of the tangential direction of the control fluid jet, the main fluid issuing from opening 22 is deflected away from its normal radial path. The main fluid deflected from the straight path to the discharge opening 26 has imparted thereto a generally arcuate or spiral path and tends to follow the flow of the control jet which has a substantially spiral flow direction toward discharge opening 26. The vortex of control fluid in the chamber creates a back pressure which impedes and, consequently, controls the flow of main fluid as a function of the pressure and flow of control fluid. The normal nondeflected flow of main fluid from opening 22 and 23 is shown by arrows 55. This flow is prevalent under circumstances when no control fluid is supplied through openings 52 and 53. The combined control and main fluids achieve a spiral direction of flow indicated by arrows 56 and are discharged through openings 26 and 27. The magnitude of the pressurized control fluid, in flow rate ore pressure, if made sufficiently large, may completely impede the flow of main fluid from openings 22 and 23 resulting in an output fluid flow through openings 26 and 27 comprising only the control fluid supplied to the vortex amplifiers. In general, the magnitude of flow rate of the main fluid substantially exceeds that of the control fluid. In some instances the magnitude of pressure of the control fluid may exceed that of the main fluid, especially under the circumstances of appreciable throttling of the flow of main fluid through the chamber. The degree of main fluid throttling or pressure drop across the vortex fluid amplifier is dependent on the relative magnitudes of flow and pressure of main and control fluids.

Under steady state conditions wherein the load is positioned at a desired location, the control fluid flows $P_{c1}$ and $P_{c2}$ have equal pressure magnitudes and the main fluid passing through each of vortex amplifiers 20 and 21 is throttled an equal amount. Under transient conditions, one of the control fluid flows $P_{c1}$, $P_{c2}$ increases in pressure magnitude while the other concurrently decreases (from a steady state value) and different degrees of throttling of the main fluid passing through the vortex amplifiers is achieved. Thus, as described hereinabove, in the case wherein pressurized control fluid $P_{c1}$ has a pressure magnitude greater than its steady state value, a greater back pressure is created within the chamber of amplifier 20 and thus the main fluid flow therein is impeded to a greater degree than in amplifier 21 wherein a control fluid pressure lower than the steady state value impedes the main fluid flow therethrough to a lesser degree than during steady state. The concurrent increase of main fluid flow through one vortex amplifier and decrease of main fluid flow through the other vortex amplifier produces the push-pull fluid pressure conditions at the junctures 16 and 17 described hereinabove resulting in a push-pull power amplification.

Since the discharge flows from vortex fluid amplifiers cannot go to zero (in the presence of any inlet flow thereto), and the main fluid inlet flow thereto can be substantially completely impeded, it is more effective to position the vortex amplifiers downstream of the load as illustrated in FIGURES 1 and 2. Such circuit configuration obtains a greater push-pull load pressure $P_{L1}-P_{L2}$ than the circuit of FIGURE 3. A second embodiment of the bridge-type power amplifier fluid circuit constructed in accordance with our invention is illustrated in FIGURE 3 wherein the vortex fluid amplifiers 20, 21 are located upstream of the load 30. The circuit of FIGURE 3 operates in substantially the same manner as the circuit of FIGURES 1 and 2 with the obvious exception that the fixed pressure drop which is obtained in the circuit of FIGURE 1 between juncture 14 and junctures 16, 17 is replaced by the controllably variable pressure drop through the vortex amplifiers in FIGURE 3.

A third embodiment of our invention includes the use of variable fluid flow restrictors in the form of vortex fluid amplifiers in each of the four legs of the bridge circuit as illustrated in FIGURE 4. The use of four vortex amplifiers necessitates the generation of two pairs of push-pull control fluid signals $P_{c1}$, $P_{c4}$ and $P_{c2}$, $P_{c3}$. These two pairs of control fluid signals may be identical, or one pair may be displaced from the other by a bias developed in fluid logic circuit 31. Thus, in general, control signals $P_{c1}$, $P_{c4}$ are identical, and signals $P_{c2}$, $P_{c3}$ are identical. The circuit of FIGURE 4 provides a greater flexibility than the circuits of FIGURES 1 and 3 in that the lack of any fixed fluid flow restrictors producing fixed pressure drops permits a more complex variation in the magnitudes of each of the two push-pull load fluid signals $P_{L1}$ and $P_{L2}$. By way of illustration, assume that control signals $P_{c1}$, $P_{c4}$ are of sufficient magnitude to completely impede the main fluid flow in the associated vortex amplifiers. Under such condition a maximum load pressure $P_{L2}$ is developed at the right side of the piston of the actuator, and a minimum pressure $P_{L1}$ at the left side.

From the foregoing description, it can be appreciated that our invention makes available a new push-pull power amplifier fluid circuit of the bridge type wherein controlled variable fluid flow restrictions are obtained with vortex-type fluid amplifiers. The fluid circuit hereinabove described features durability, reliability and an essentially unlimited life-span since no mechanical moving parts are involved thereby avoiding frictional wear and being particularly ideal for applications wherein conditions of nuclear radiation, high temperature, vibration and mechanical shock may be present. Further, the circuit can be produced at low cost due to its ease of fabrication from virtually any material that is nonporous and has structural rigidity. In addition, the circuit may be connected in circuit relationship with other fluid circuitry in control systems by appropriate external interconnection therewith, or, by the formation of the several fluid circuits in interconnected fashion directly in a single piece of material.

Having described three embodiments of our bridge-type power amplifier fluid circuit, it is believed obvious that modification and variation of our invention is possible in light of the above teachings. Thus, other types of vortex fluid amplifiers may be employed, the particular vortex amplifier illustrated being exemplary of vortex amplifiers in general. Also, the load pressures $P_{L1}$, $P_{L2}$ may not be equal in the steady state condition, as determined by the nature of the specific load. It is, therefore, to be understood that changes may be made in the particular embodiments of our invention as described which are within the full intended scope of the invention as defined by the following claims.

What we claim as new and desire to secure by Letters Patent of the United States is:

1. A bridge-type fluid circuit comprising
    first and second fluid flow restrictors connected respectively in first and second legs of a fluid bridge circuit,
    third and fourth variable fluid flow restrictors having no moving mechanical parts and connected respectively in third and fourth legs of the bridge circuit,
    means for supplying fluid to a first juncture of two legs of the bridge circuit,
    means for removing fluid from a second juncture of the bridge circuit wherein said second juncture is located diametrically opposite said first juncture,
    means for supplying control fluid to at least said third and fourth restrictors, and
    means for connecting a load between third and fourth junctures of the bridge circuit wherein said third and fourth junctures are located intermediate said first and second junctures to obtain a push-pull output fluid signal.

2. A bridge-type fluid circuit comprising
    first, second, third and fourth fluid passages connected in bridge circuit relationship,
    first and second fluid flow restrictors connected respectively in the first and second fluid passages of said bridge circuit,
    third and fourth variable fluid flow restrictors having no moving mechanical parts and connected respectively in the third and fourth fluid passages of said bridge circuit,
    means for supplying pressurized main fluid to a juncture of a first pair of the fluid passages,
    means for removing fluid from a juncture of a second pair of the fluid passages,
    means for supplying pressurized control fluid to at least said third and fourth restrictors, and
    means for connecting a load between junctures of a third and fourth pair of the fluid passages.

3. A bridge-type fluid circuit containing no moving mechanical parts and having all of the fluid circuit elements thereof fabricated from a single member of nonporous, structurally rigid material and comprising
    first and second fluid flow restrictors connected respectively in first and second legs of a fluid bridge circuit, third and fourth variable fluid flow restrictors connected respectively in third and fourth legs of the bridge circuit,
    means for supplying fluid to a juncture of the first and second legs of the bridge circuit,
    means for removing fluid from a juncture of the third and fourth legs of the bridge circuit,
    means for supplying control fluid to at least said third and fourth restrictors, and
    means for connecting a load between a juncture of the first and third legs of the bridge circuit and a juncture of the second and fourth legs of the bridge circuit.

4. A bridge-type circuit containing no moving mechanical parts and having all of the fluid circuit elements thereof fabricated from a single member of nonporous, structurally rigid material and comprising
    first and second variable fluid flow restrictors connected respectively in first and second legs of a fluid bridge circuit,
    third and fourth fluid flow restrictors connected respectively in third and fourth legs of the bridge circuit,
    means for supplying fluid to a juncture of the first and second legs of the bridge circuit,
    means for removing fluid from a juncture of the third and fourth legs of the bridge circuit,
    means for supplying control fluid to at least said first and second restrictors, and
    means for connecting a load between a juncture of the first and third legs of the bridge circuit and a juncture of the second and fourth legs of the bridge circuit.

5. A bridge-type fluid circuit comprising
    first, second, third and fourth fluid passages connected in bridge circuit relationship,
    first and second fluid flow restrictors connected respectively in the first and second fluid passages of said bridge circuit,
    third and fourth variable fluid flow restrictors having no moving mechanical parts and connected respectively in the third and fourth fluid passages of said bridge circuit,
    means for supplying pressurized main fluid to a juncture of a first pair of the fluid passages,
    means for removing fluid from a juncture of a second pair of the fluid passages,
    means for supplying pressurized control fluid to said third and fourth restrictors, and
    means for connecting a load between a juncture of a third pair of the fluid passages and a juncture of a fourth pair of the fluid passages.

6. A bridge-type fluid circuit comprising
    first, second, third and fourth fluid passages connected in bridge circuit relationship,
    first and second fixed fluid flow restrictors connected respectively in the first and second fluid passages of said bridge circuit,
    third and fourth variable fluid flow restrictors having no moving mechanical parts and connected respectively in the third and fourth fluid passages of said bridge circuit,
    means for supplying pressurized main fluid to a juncture of the first and second fluid passages, means for removing fluid from a juncture of a third and fourth fluid passages, means for supplying pressurized control fluid to said third and fourth restrictors, and means for connecting a load between a juncture of the first and third fluid passages and a juncture of the second and fourth fluid passages.

7. A bridge-type fluid circuit comprising first, second, third and fourth fluid passages connected in bridge circuit relationship, first and second variable fluid flow restrictors having no moving mechanical parts and connected respectively in said first and second fluid passages of the bridge circuit, third and fourth fixed fluid flow restrictors connected respectively in said third and fourth fluid passages of the bridge circuit, means for supplying pressurized main fluid to a juncture of the first and second fluid passages, means for removing fluid from a juncture of the third and fourth fluid passages, means for supplying pressurized control fluid to said variable fluid flow restrictors, and means for connecting a load between a juncture of the first and third fluid passages and a juncture of the second and fourth fluid passages.

8. A bridge-type power amplifier fluid circuit comprising first, second, third and fourth fluid passages connected in bridge circuit relationship, first and second fluid flow restrictors connected respectively in said first and second fluid passages of the bridge circuit, third and fourth vortex-type fluid amplifiers connected respectively in said third and fourth fluid passages of the bridge circuit, means for supplying pressurized main fluid to a first juncture of the bridge circuit, means for removing fluid from a second juncture of the bridge circuit, means for supplying pressurized control fluid to said vortex fluid amplifiers, and means for connecting a load between third and fourth junctures of the bridge circuit wherein said third and fourth junctures are located intermediate first and second junctures.

9. A bridge-type power amplifier fluid circuit comprising first, second, third and fourth fluid passages interconnected at four junctures in bridge circuit relationship, first and second fixed fluid flow restrictors connected respectively in said first and second fluid passages of the bridge circuit, third and fourth vortex-type fluid amplifiers connected respectively in said third and fourth fluid passages of the bridge circuit, means for supplying pressurized main fluid to a juncture of the first and second fluid passages, means for removing fluid from juncture of the third and fourth fluid passages, means for supplying pressurized control fluid to control fluid inlets of said vortex fluid amplifiers, and means for connecting a load between a juncture of the first and third passages and a juncture of the second and fourth passages.

10. A bridge-type power amplifier fluid circuit comprising first, second, third and fourth fluid passages interconnected at four junctures in bridge circuit arrangement, first and second vortex-type fluid amplifiers connected respectively in said first and second fluid passages of the bridge circuit, third and fourth fixed fluid flow restrictors connected respectively in said third and fourth fluid passages of the bridge circuit, means for supplying pressurized main fluid to a juncture of the first and second fluid passages, the main fluid being supplied to main fluid inlets of said vortex fluid amplifiers, means for removing fluid from a juncture of the third and fourth fluid passages, means for supplying pressurized control fluid to control fluid inlets of said vortex fluid amplifiers, and means for connecting a load between a juncture of the first and third passages and a juncture of the second and fourth passages.

11. A bridge-type power amplifier fluid circuit comprising four fluid passages interconnected in bridge circuit relationship, a variable fluid flow restrictor having no moving mechanical parts and connected in each of said fluid passages, means for supplying pressurized main fluid to a first juncture of the bridge circuit, means for removing fluid from a second juncture of the the bridge circuit, means for supplying control fluid to each of said variable fluid flow restrictors, and means for connecting a load between third and fourth junctures of the bridge circuit wherein said third and fourth junctures are located intermediate said first and second junctures.

12. A bridge-type power amplifier fluid circuit comprising four fluid passages interconnected in bridge circuit relationship, a vortex-type fluid amplifier connected in each of said fluid passages, means for supplying pressurized main fluid to a first juncture of the bridge circuit, the main fluid supplied to main fluid inlets of the vortex fluid amplifiers connected in the fluid passages associated with said first juncture, means for removing fluid from a second juncture of the bridge circuit, means for supplying control fluid to control fluid inlets of each of said vortex-type fluid amplifiers, and means for connecting a load between third and fourth junctures of the bridge circuit wherein said third and fourth junctures are located intermediate said first and second junctures.

References Cited

UNITED STATES PATENTS

| | | | |
|---|---|---|---|
| 1,791,613 | 2/1931 | Clay | 251—31 |
| 2,984,218 | 5/1961 | Christianson | 137—596.15 |
| 3,024,768 | 3/1962 | Shalgren | 137—596 X |
| 3,143,856 | 8/1964 | Haussmann | 137—81.5 X |
| 3,152,612 | 10/1964 | Avery | 137—625.62 X |
| 3,171,422 | 3/1965 | Evans | 137—81.5 |
| 3,199,535 | 8/1965 | Baer | 137—596 |
| 3,267,946 | 8/1966 | Adams et al. | 137—81.5 |
| 3,272,215 | 9/1966 | Bjornsen et al. | 137—81.5 |
| 3,282,168 | 11/1966 | Hayner et al. | 137—625.62 X |

SAMUEL SCOTT, *Primary Examiner.*